UNITED STATES PATENT OFFICE.

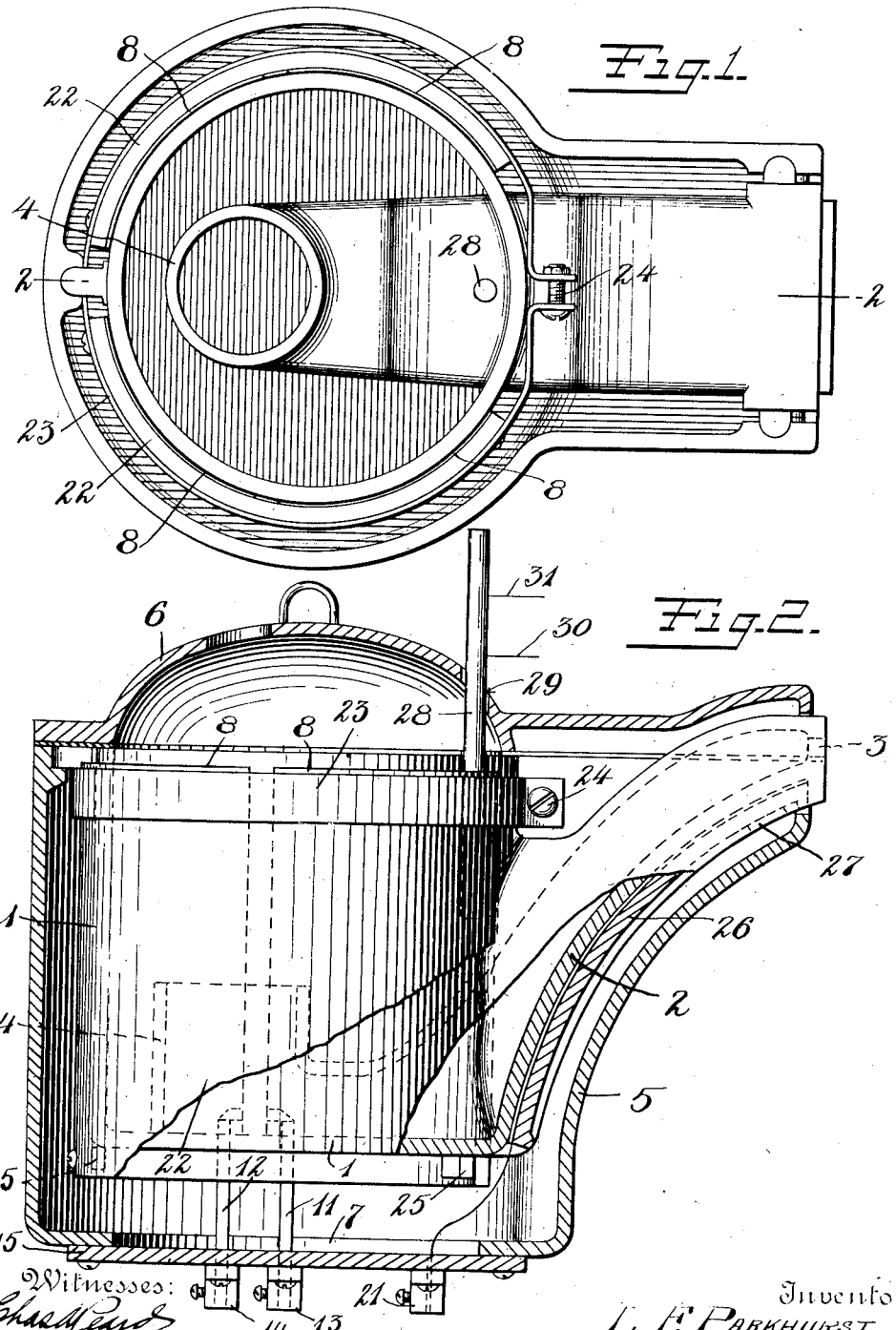

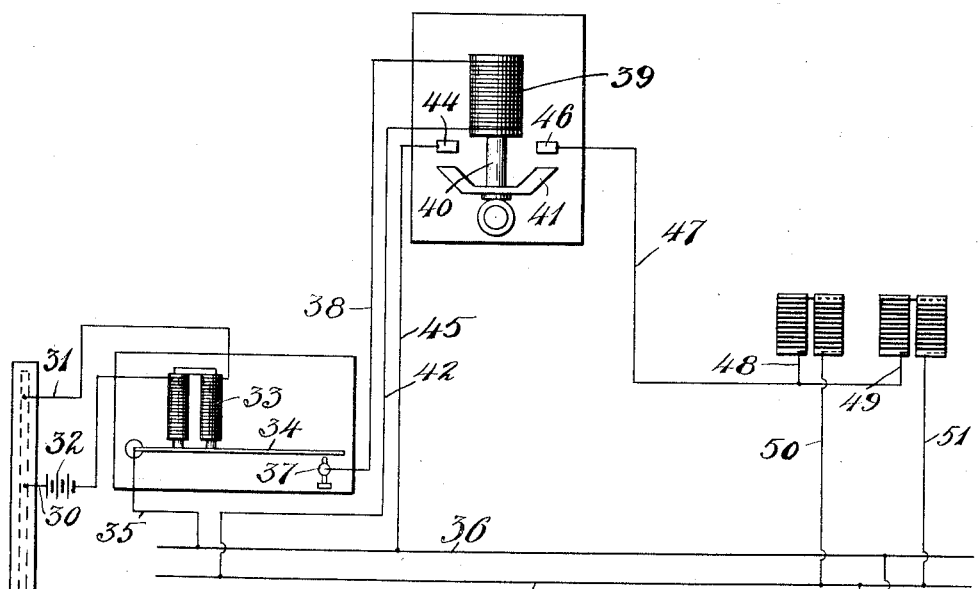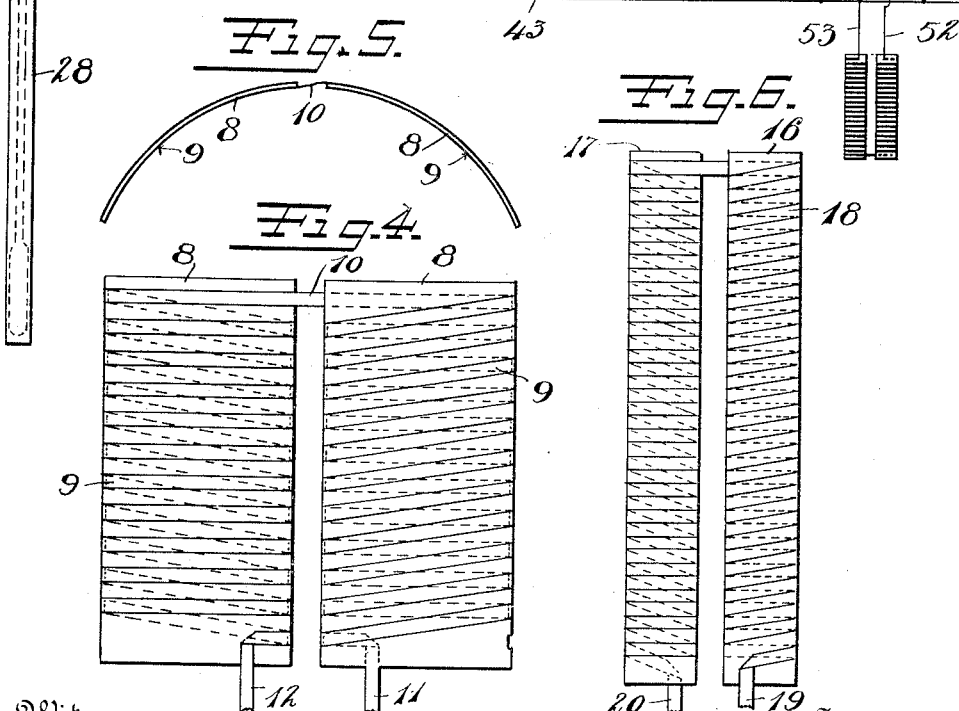

LEON F. PARKHURST, OF BINGHAMTON, NEW YORK, ASSIGNOR TO DIAMOND ELECTRIC COMPANY, OF BINGHAMTON, NEW YORK, A CORPORATION OF NEW YORK.

ELECTRIC HEATING APPARATUS.

1,023,755.     Specification of Letters Patent.     Patented Apr. 16, 1912.

Application filed February 15, 1911. Serial No. 608,668.

*To all whom it may concern:*

Be it known that I, LEON F. PARKHURST, a citizen of the United States, residing at Binghamton, county of Broome, State of New York, have invented certain new and useful Improvements in Electric Heating Apparatus, of which the following is a full, clear, and exact description.

My invention relates to improvements in electric heating apparatus, and particularly to such apparatus as is especially adapted for the heating of the melting pot of a linotype machine, although it is to be understood that the invention may be applied in other relations.

The object of the invention is to so construct and arrange the heating units that they may be located in close relation with the vessel to be heated so that practically all of the heat of the units will be imparted to said vessel. With this object in view, the units are so constructed that they may be readily shaped to conform to the particular part of the vessel to which they are applied.

A further object is to provide an improved form of regulating apparatus for the heating apparatus.

With these objects in view, the invention consists in the construction and arrangement of parts, a preferred embodiment of which is illustrated in the accompanying drawings, in which—

Figure 1 is a plan view of the melting pot of a linotype machine with which the invention is used. Fig. 2 is a sectional view on the line 2—2 Fig. 1. Fig. 3 is a diagrammatic view of the automatic heat regulating apparatus to be used in conjunction with the heating apparatus. Fig. 4 is a face view of one of the double heat units detached, showing the arrangement of the resistance element. Fig. 5 is a top edge view of the unit shown in Fig. 4, and Fig. 6 is a view similar to Fig. 4, of a double heat unit particularly adapted to be located along the throat of the melting pot.

In the embodiment of my invention herein selected for illustration, and referring particularly to Figs. 1 and 2, 1 represents the melting pot of a linotype machine having the throat 2 provided with an elongated aperture 3, by which the molten metal is conducted to the matrix. The throat 2 communicates with the usual dash-pot or cylinder 4, in which a plunger operates to eject the metal through the throat 2 in the manner well known to those familiar with this art. The pot 1 and throat 2 are surrounded by the usual heat retaining jacket 5, having a cover 6, which extends both over the top of the casing and that portion surrounding the throat. The under side of the casing is provided with an opening 7, through which heat is ordinarily communicated to the pot from any desired source.

Referring now to Figs. 4, 5 and 6, the heat unit embodying my improvement comprises a pair of supporting slabs 8—8 preferably of mica, upon which is wound a resistance element 9 in the form of a ribbon conductor, which is wound from the lower end of one of the supporting slabs, crossed over to the other at 10, and wound down upon the other slab 8, thus bringing the terminals 11 and 12 of the conductor to the same end of the unit. One or more of these double units may then be bent around the pot, as indicated in dotted outline, Fig. 2, and the terminals 11 and 12 brought down to binding posts 13 and 14 mounted upon an insulating plate 15 secured to the bottom of the casing 5, to which binding posts the leads of the circuit from any desired source of current may be attached.

In order to properly heat the throat of the pot, I provide the somewhat narrower unit comprising the supporting strips or slabs 16 and 17, having the ribbon conductor 18 wound thereon in a manner similar to that shown in Fig. 4, and bringing the terminals 19 and 20 down to the same end of the unit. These terminals may be secured to a suitable pair of binding posts 21 also mounted upon the insulating plate 15. The heat units described for the walls of the pot and the throat may be insulated from the pot by sheets of mica, or like thin insulation, and the units are held in intimate contact with the walls of the pot by plates 22 of cast iron, which plates are held in place at the top by means of a clamping band 23, the ends of which are brought together and secured by screw 24. The plates 22 are also secured at the bottom to lugs 25 on the bottom of the pot. The heat unit for the throat may be held in intimate contact therewith by means of a similar clamping plate 26 of cast iron, which is conveniently held between the flanges 27, which are usually provided upon the lower side of the throat to strengthen the same.

In order to automatically regulate the degree of heat imparted to the pot or vessel, the latter is provided with a thermostatic device comprising a thermometer 28 extending through a suitable aperture 29 in the cover of the pot down below the level of the contents thereof. Within the walls of the thermometer tube are secured terminals 30 and 31 of a relay circuit comprising a battery 32, and a relay magnet 33 having an armature 34. This armature is connected by wire 35 with one of the line wires 36 from the desired source of current, and adjacent the opposite end of the armature is a contact 37 connected by wire 38 with a solenoid switch comprising a coil 39, core 40 and switch arm 41. From the solenoid coil 39 a wire 42 extends to the opposite line wire 43. Adjacent one end of the switch arm or connector 41 is a contact 44 connected by wire 45 with the line wire 36, and adjacent the opposite end of the connector 41 is a contact 46 connected by wire 47 with corresponding terminals 48 and 49 of the heat units, which are located at the sides of the pot. The opposite terminals of these heat units are connected by wires 50 and 51 with the opposite line wire 43. The heat unit for heating the throat of the pot is connected by wires 52 and 53 with the opposite line wires.

By the above described arrangement of circuits it will be seen that as the mercury column in the thermometer rises to the height of the relay terminal 31, the circuits of the heat units for the sides of the pot will be broken through the armature 34 and the solenoid switch described. Inasmuch as it is desirable that the metal within the throat of the melting pot be kept constantly in liquid condition in order that it may be readily ejected by action of the plunger in the cylinder 4, the circuit for the throat heat unit is constantly maintained, as will be seen from inspection of the diagrammatic view of circuits, Fig. 3.

From the above description it will be seen that the heating units herein employed, inasmuch as they are constructed of thin supporting slabs with a flat ribbon conductor wound thereon, are peculiarly adapted to be bent to conform to the shape of the vessel with which they are used and to be brought into intimate relation with the walls of the vessel. Moreover, in the particular application of the heating units herein described, the same are peculiarly adapted for use with the usual form of melting apparatus of linotype machines without the necessity of in any way altering the construction of said apparatus, since there is ample space between the outer wall of the pot proper and the casing surrounding the same to position these flat units, and likewise the unit of the throat is peculiarly adapted to be shaped to the under side of said throat and conveniently held in position relatively thereto. By making the units of the double form here shown, the terminals may be all conveniently brought to the bottom of the vessel and secured to the binding posts at the bottom of the casing. Furthermore, by employing an automatic heat regulating device in conjunction with the units for heating the pot proper, and by connecting the throat unit directly with the source of current, the heat for the pot may be regulated to conform to all conditions of use, thus effecting economy in the consumption of current, while the heat of the throat may remain constant to maintain the throat in proper condition at all times for the ready ejection of the metal.

While I have herein described a particular form of my invention, it is to be understood that the same may be altered in details and relative arrangement of parts within the scope of the appended claims.

What I claim is:

1. In electric heating apparatus, the combination with a vessel to be heated, said vessel having a throat for egress of the contents thereof, of one or more heating units applied to the walls of said vessel, a separate heating unit applied to the throat of said vessel, means for automatically regulating the degree of heat of said first named units and means for maintaining the heat of said second named unit constant, and a source of energy for said units.

2. In electric heating apparatus, the combination with a vessel to be heated, said vessel having a throat for the egress of the contents thereof, of one or more heating units, means for causing said units to conform to the shape of the walls of said vessel and holding the same in close relation thereto, a separate heating unit adjacent to said throat, means for holding said separate unit in close conformity to the shape of said throat, means for automatically regulating the degree of heat of said wall heating units and means for maintaining a constant heat for said throat heating unit, and a source of energy for said units.

3. In electric heating apparatus, the combination with a vessel to be heated, of one or more electric heating units, means to cause said units to conform to the shape of the walls of said vessel and to hold the same in close relation thereto, a thermostatic device to automatically regulate the degree of heat of said units in accordance with the predetermined degree of heat of the contents of said vessel, a throat for said vessel for the egress of the contents thereof, a separate heat unit, means to cause said unit to conform to the shape of said throat and to hold the same in close relation thereto, means constructed and arranged to maintain a comparatively high degree of heat in said separate unit, and a source of energy for said units.

LEON F. PARKHURST.

Witnesses:
 ISRAEL T. DEYO,
 EDNA G. CARL.